(12) United States Patent
Gao et al.

(10) Patent No.: US 12,155,765 B1
(45) Date of Patent: Nov. 26, 2024

(54) SECURE SHARING OF DATA BETWEEN APPLICATIONS

(71) Applicant: American Express Travel Related Services Company, Inc., New York, NY (US)

(72) Inventors: Jile Gao, New York, NY (US);
Maxwell Hardy, New York, NY (US);
Terence Lee, New York, NY (US);
Daniel J Leonardis, New York, NY (US); Nimiksha Mahajan, New York, NY (US); Ely Marrero, New York, NY (US); Mohammad Naz, New York, NY (US); Oleksii Ozun, London (GB);
Julia Roytman, New York, NY (US);
Brent Watson, Calgary (CN)

(73) Assignee: AMERICAN EXPRESS TRAVEL RELATED SERVICE COMPANY, INC., New York, NY (US)

(*) Notice: Subject to any disclaimer, the term of this patent is extended or adjusted under 35 U.S.C. 154(b) by 319 days.

(21) Appl. No.: 17/556,340

(22) Filed: Dec. 20, 2021

(51) Int. Cl.
*H04L 9/32* (2006.01)
*G06F 21/44* (2013.01)
*G06F 21/60* (2013.01)

(52) U.S. Cl.
CPC ............ *H04L 9/3213* (2013.01); *G06F 21/44* (2013.01); *G06F 21/602* (2013.01)

(58) Field of Classification Search
CPC ....... H04L 9/3213; G06F 21/44; G06F 21/602
See application file for complete search history.

(56) References Cited

U.S. PATENT DOCUMENTS

| 2021/0326430 A1* | 10/2021 | Coimbra | G06F 16/9535 |
| 2022/0058633 A1* | 2/2022 | Yantis | G06Q 20/3676 |
| 2022/0328148 A1* | 10/2022 | Longmire | G06F 21/6245 |

* cited by examiner

*Primary Examiner* — Normin Abedin
(74) *Attorney, Agent, or Firm* — Thomas Horstemeyer, LLP (57) ABSTRACT

Disclosed are various embodiments for securely sharing confidential data between applications. A deep link request can be received from a first computing device, the deep link request identifying a set of data to be shared and a deep link schema. A token that represents the set of data can then be created. Also, a deep link that complies with the deep link schema and includes the token can also be created. The deep link and the token can then be returned to the first computing device. Later, a data request containing the token can be received from a second computing device. The set of data associated with the token can then be return to the second computing device.

20 Claims, 6 Drawing Sheets

SECURE SHARING OF DATA BETWEEN APPLICATIONS

BACKGROUND

Applications often wish to share data that is confidential or sensitive, but lack a secure communications channel over which data can be shared. For example, two applications could be installed on the same computing device (e.g., a personal computer, a smart phone, a tablet, etc.), and one application may wish to share sensitive or confidential data with the second application. However, the computing device may not provide any security guarantees for the transfer of data between two applications. For example, if the two applications read from and write to the same shared memory space or shared file, a third application may be able to read from the same shared memory space or shared file as well. As another example, malicious applications may be installed to impersonate one of the two applications in order to capture confidential data. As another example, the two applications could be installed on separate computing devices, and the network or data communication between the two may be untrusted or insecure (e.g., unencrypted). Any third-party could intercept and capture data transmitted between the two applications in this example.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for securely sharing data between applications across an untrusted or insecure communications channel. A first application obtains a token from its respective endpoint. The token can be associated with a set of confidential information (e.g., a set or subset of the personally identifying information of a user) that a user has authorized for disclosure to a second application. The first application then provides the token to the second application. The second application can provide the token to its respective endpoint. The endpoint for the second application can then provide the token to the endpoint for the first application using a secured communications channel. In response, the endpoint for the first application can provide the confidential information associated with the token to the endpoint for the second application, which can relay the confidential information to the second application for further processing. As a result, the first application has shared the confidential information with the second application in spite of the insecurity of the communications channel between the first application and the second application. Therefore, the security of the communications between the two applications is improved by allowing applications to share data across an insecure communications channel without compromising or disclosing the confidential information.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
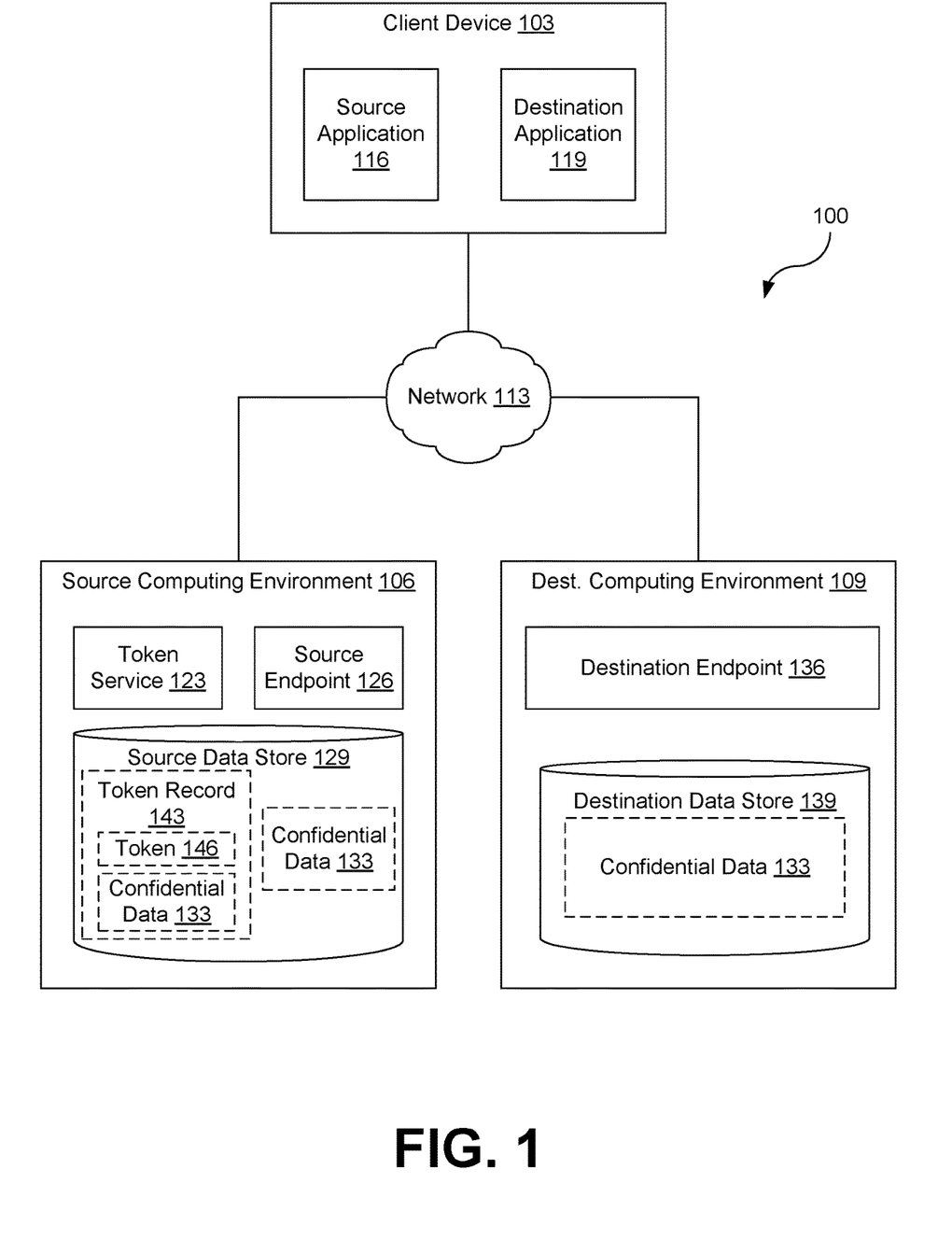
FIG. 1 is a drawing of a network environment according to various embodiments of the present disclosure.

With reference to FIG. 1, shown is a network environment 100 according to various embodiments. The network environment 100 can include a client device 103, a source computing environment 106, and a destination computing environment 109, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The client device 103 representative of a plurality of client devices that can be coupled to the network 113. The client device 103 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 103 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 103 or can be connected to the client device 103 through a wired or wireless connection.

The client device 103 can be configured to execute various applications such as a source application 116 and a destination application 119. Client applications such as the source application 116 and/or the destination application 119 can be executed in the client device 103 to access or interact with network content served by the source computing environment 106 and/or the destination computing environment 109, thereby rendering a user interface on the display. To this end, the source application 116 and/or the destination application 119 can include a browser, a dedicated application (e.g., email application, social networking application, messaging application, office or productivity application, file sharing application, etc.), or other executable, and the user interface can include a web page, an application screen, or other user mechanism for obtaining user input. As discussed later, the source application 116 may wish to share confidential information with the destination application 119 at times.

The source computing environment 106 and the destination computing environment 109 can each include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, source computing environment 106 and the destination computing environment 109 can each employ a plurality of computing devices that can be arranged in one or more server banks or computer banks or other arrangements. Such computing devices can be located in a single installation or can be distributed among many different geographical locations. For example, the source computing environment 106 or the destination computing environment 109 can include a plurality of computing devices that together can include a hosted computing resource, a grid computing resource or any other distributed computing arrangement. In some cases, the source computing environment 106 or the destination computing environment 109 can correspond to an elastic computing resource where the allotted capacity of processing, network, storage, or other computing-related resources can vary over time.

Various applications or other functionality can be executed in the source computing environment 106. The components executed on the source computing environment 106 include a token service 123, a source endpoint 126, and other applications, services, processes, systems, engines, or functionality not discussed in detail herein.

Also, various data is stored in a source data store 129 that is accessible to the source computing environment 106. The source data store 129 can be representative of a plurality of data stores, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the source data store 129 is associated with the operation of the various applications or functional entities described below. This data can include confidential data 133, one or more token records 143, and potentially other data.

The confidential data 133 can represent any data that is to be shared between the source application 116 and the destination application 119. Although the confidential data 133 can include any data and/or metadata, it is described as confidential to indicate that the confidential data 133 should be shared or transmitted over secure communications channels or using secure communications techniques. Examples of confidential data 133 can include personally identifying information (PII) of users or customers (e.g., legal names, account numbers, email addresses, mailing addresses, telephone numbers, authentication credentials, etc.), files or documents containing confidential information, etc.

A token record 143 can represent a mapping or an association between a set or subset of the confidential data 133 stored in the source data store 129 and a token 146 created by the token service 123. Accordingly, a token record 143 can include a token 146 and the associated set or subset of the confidential data 133. In some implementations, the token record 143 can also include data such as the time the token record 143 was created, the time the token 146 should expire, whether the token 146 has been previously presented to redeem or retrieve the confidential data 133 in the token record 143, etc.

The token 146 itself can represent any unique data, value, or datagram that can uniquely identify a token record 143 with respect to another token record 143. Tokens 146 can be created using a variety of approaches, such as cryptographic hash functions.

The token service 123 can be executed to generate tokens 146 that are associated or linked to confidential data 133 to be shared by the source application 116. For example, the token service 123 could receive a token request that specifies which set or subset of confidential data 133 is to be shared. The token service 123 could then create a token 146 mapped to the set or subset of the confidential data 133. Accordingly, the token service 123 can also create a token record 143 that stores the mapping or association between the token 146 and the confidential data 133. When the token service 123 subsequently receives the token 146, it can then return the set or subset of the confidential data 133 in response.

The source endpoint 126 can be executed to provide a communications interface between the source application 116 and other services, applications, etc. hosted by the source computing environment 106. For example, the source endpoint 126 can facilitate communications between the source application 116 and the token service 123 or between the source application 116 and the source data store 129, discussed later.

Various applications or other functionality can be executed in the destination computing environment 109. The components executed on the destination computing environment 109 can include the destination endpoint 136, and other applications, services, processes, systems, engines, or functionality not discussed in detail herein.

The destination endpoint 136 can be executed to provide a communications interface between the destination application 119 and other services, applications, etc. hosted by the destination computing environment 109 or the source computing environment 106. For example, the destination endpoint 136 could obtain relay tokens 146 provided by the destination application 119 to the token service 123. Likewise, the destination endpoint 136 could receive confidential data 133 from the token service 123 associated with the token 146 and store the confidential data 133 in the destination data store 139 or relay the confidential data 133 to the destination application 119.

Also, various data is stored in a destination data store 139 that is accessible to the destination computing environment 109. The destination data store 139 can be representative of a plurality of data stores, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the destination data store 139 is associated with the operation of the various applications or functional entities described below. This data can include confidential data 133 received from the token service 123, and potentially other data.

Next, a general description of the operation of the various components of the network environment 100 is provided. Although the following description provides one example of the interaction between the various components of the network environment 100, it is understood that other operations or interactions are also possible. Additional detail about the operation of individual components of the network environment 100 are provided in the discussion accompanying FIGS. 2-7.

To begin, the source application 116 can obtain user input to share confidential data 133 with the destination application 119. The source application 117 can then send a request for a deep link to the source endpoint 126.

For reference, a deep link is a type of link that allows an application to open another application and navigate to the desired resource or functionality within that application, as specified by the deep link. Each application installed on a client device 103 can be associated with a unique namespace that allows for other applications to use deep linkdeep links to invoke execution of the application. For example, the AMERICAN EXPRESS® mobile application could be associated with the "amex" namespace, so that deep linkdeep links beginning with the "amex:// . . . " when followed, would open the AMERICAN EXPRESS mobile application. Depending on the contents of the deep link, following it could further cause one to automatically navigate to specific feature or function of the AMERICAN EXPRESS mobile application. As an illustrative example, the hypothetical deep link "amex://accountbalance," when invoked or processed by another application, could cause the AMERICAN EXPRESS mobile application to begin execution and show the user his or her account balances after the user authenticates himself or herself.

The source endpoint 126 can then forward to the token service 123 the identity of the set or subset of confidential data 133 to be shared. The token service 123 can then create a token 146 and store the token 146 and store the token in association with the confidential data 133 in a token record 143. The token service 123 can then return the token 146 to the source endpoint 126.

The source endpoint 126 can, in turn, create the deep link for the destination application 119 that was requested by the source application 116. Once the deep link is created, the deep link and the token 146 can be returned by the source endpoint 126 to the source application 116.

Once the source application 116 receives the deep link and token 146, it can execute the destination application 119 using the deep link. The destination application 119 can then send the token 146 to the destination endpoint 136.

The destination endpoint 136 can, in turn, send the token 146 to the token service 123. In response to receiving the token 146, the token service 123 can return the confidential data 133 associated with the token 146 to the destination endpoint 136. The destination endpoint 136 can then return the confidential data 133 to the destination application 119. As a result, the confidential data 133 is shared with the destination application 119 by the source application 116 without risk of interception by other applications executing on the client device 103.

Figure 2:
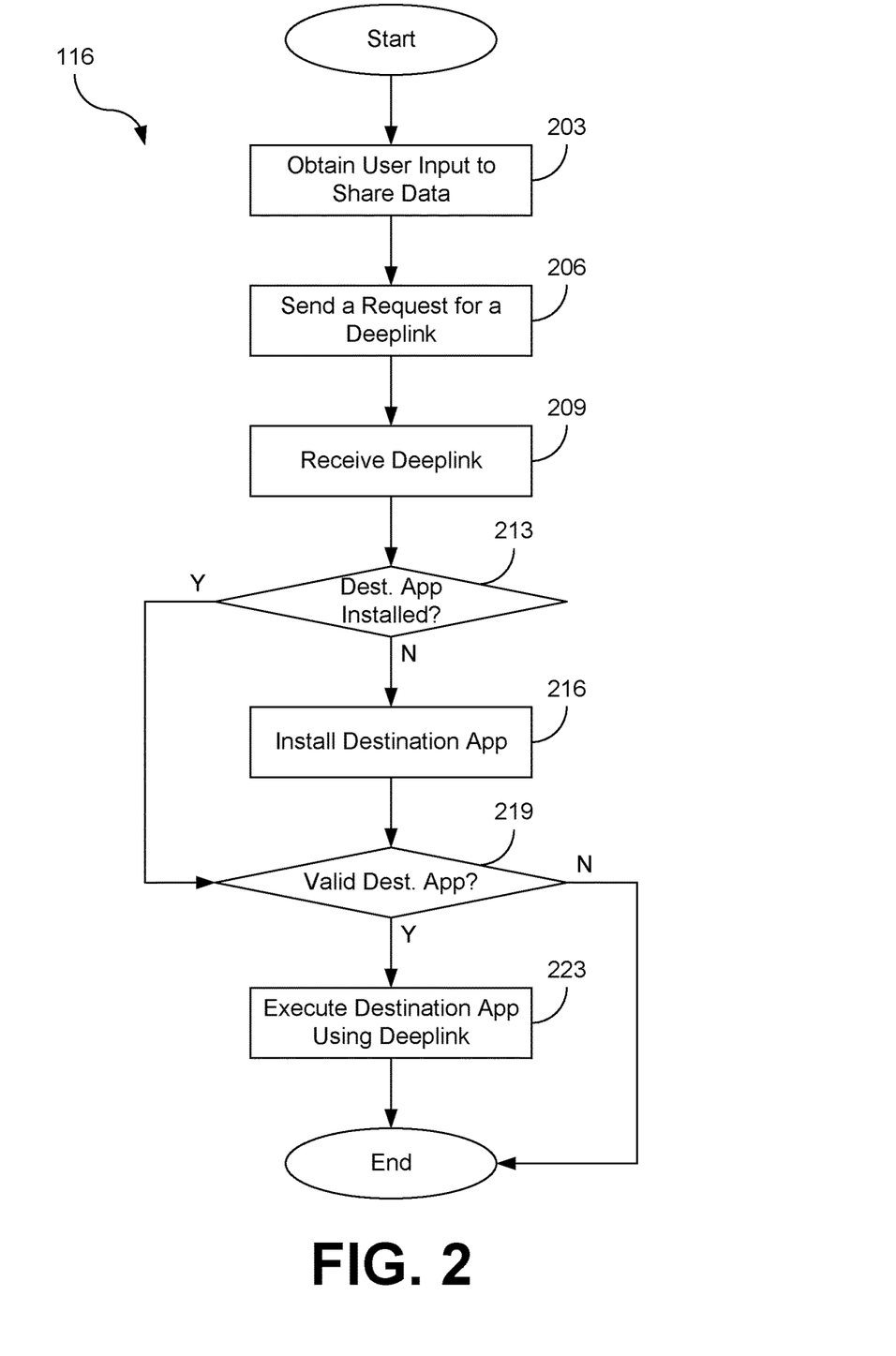
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the source application 116. The flowchart of FIG. 2 provides merely an example of the many different types of functional arrangements that can be employed to implement the operation of the depicted portion of the source application 116. As an alternative, the flowchart of FIG. 2 can be viewed as depicting an example of elements of a method implemented within the network environment 100.

Beginning with block 203, the source application 116 can obtain user input to share confidential data 133 with a destination application 119. The user input could identify the destination application 119 with which the confidential data 133 is to be shared, the set or subset of confidential data 133 to be shared, etc. These selections can be explicit or implicit. As an example of an implicit user selection or input, if the source application 116 were a mobile banking application, and the user selected an offer from the bank's partner that was offered within the source application 116, this acceptance of the offer could implicitly identify the destination application 119 of the bank's partner and any personally identifying information of the user required by the destination application 119 to process the acceptance of the offer.

Next, at block 206, the source application 116 can send a request for a deep link to the source endpoint 126. The request for the deep link can include information such as an identifier of the destination application 119 or a schema to use for the deep link. The request for the deep link can also identify the set or subset of confidential data 133 to be shared with the destination application 119.

Moving to block 209, the source application 116 can then receive the deep link from the source endpoint 126 in response to the request sent at block 206. The deep link can be formatted according to the schema specified by the source application 116 or that is predefined for the destination application 119. The deep link can also include a token 146 generated by the token service 123, where the token 146 is associated with the set or subset of confidential data 133 to be shared with the destination application 119.

Then, at block 213, the source application 116 can determine or confirm if the destination application 119 is installed on the client device 103. For example, the source application 116 could analyze the schema of the deep link to identify the namespace of the destination application 119. If no application with the identified namespace is installed on the client device 103, then the process can proceed to block 216. However, if an application matching the identified namespace is installed on the client device 103, then the process can skip to block 219.

If the process proceeds to block 216, then the source application 116 can cause an application with the identified namespace to be installed on the client device 103. For example, if the client device 103 were an APPLE IPHONE®, the client device 103 could send a request that includes the identified namespace to the APPLE APP STORE, thereby causing the APPLE APP STORE to install the destination application 119 on the client device 103.

Next, at block 219, the source application 116 can also validate or otherwise authenticate the destination application 119. This can be done, for example, to confirm that the destination application 119 is not a counterfeit, fraudulent, or malicious application. To confirm the validity of the destination application 119, the source application 116 could evaluate a signature of the destination application 119 created by the private key of the author or publisher of the destination application 119. If the signature failed to match, then the source application 116 could determine that the destination application 119 is an invalid, counterfeit, or otherwise unauthorized version. As another example, the source application 116 could analyze the schema of the deep link to identify the namespace of the destination application 119. If the namespace of the destination application 119 installed on the client device 103 failed to match the namespace identified from the deep link, then the source application 116 could determine that the destination application 119 is an invalid, counterfeit, or otherwise unauthorized version. If the destination application 119 is valid, then the process can proceed to block 223. However, if the destination application 119 is invalid, then the process could end or terminate.

If the process proceeds to block 223, then the source application 116 can process the deep link to invoke or otherwise initiate execution of the destination application 119. This can include passing the token 146 included in the deep link to the destination application 119. Once the destination application 119 begins execution, then the process can end.

Figure 3:
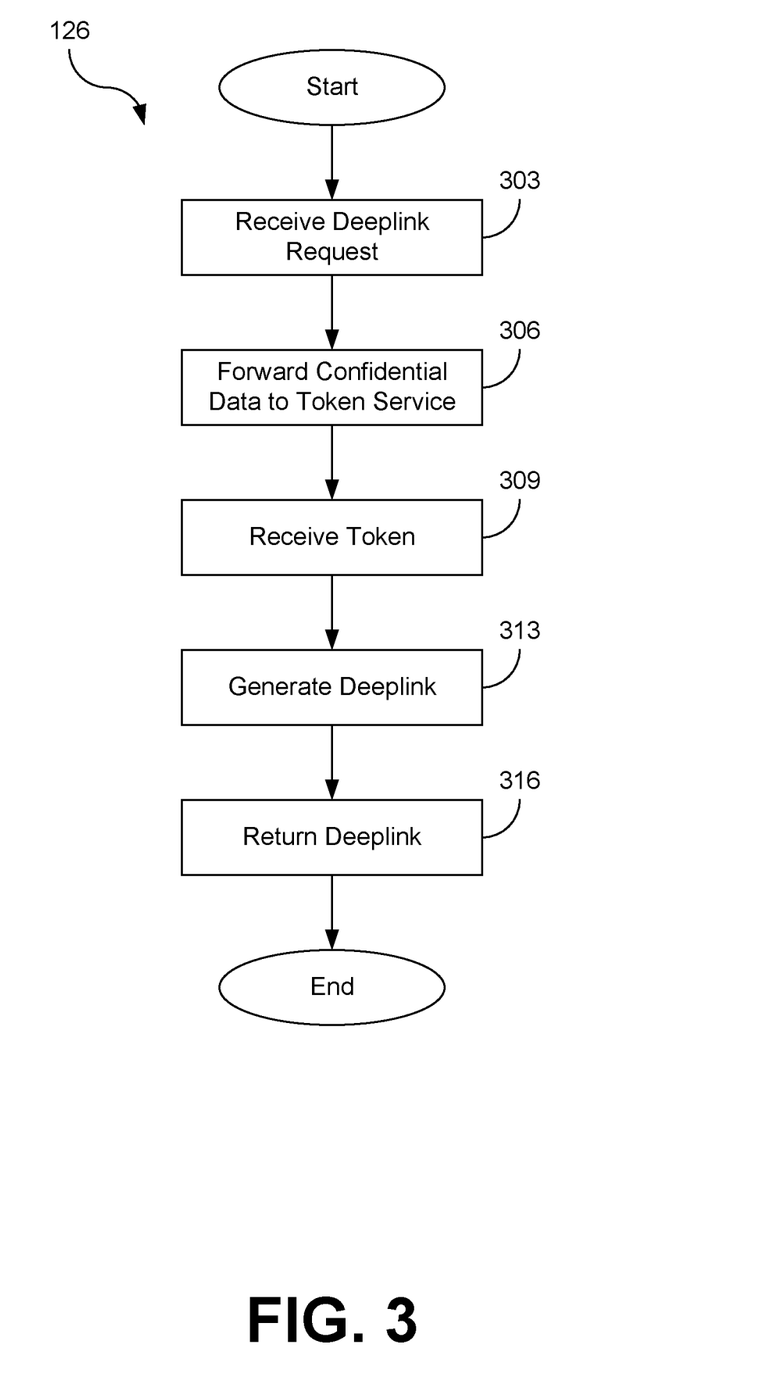
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the source endpoint 126. The flowchart of FIG. 3 provides merely an example of the many different types of functional arrangements that can be employed to implement the operation of the depicted portion of the source endpoint 126. As an alternative, the flowchart of FIG. 3 can be viewed as depicting an example of elements of a method implemented within the network environment 100.

Beginning with block 303, the source endpoint 126 can receive a deep link request from the source application 116. This deep link request could include an identifier of a destination application 119 and could also identify a set or subset of confidential data 133 that the user has implicitly or explicitly authorized to be shared with the destination application 119.

Then at block 306, the source endpoint 126 can forward the confidential data 133 identified in the deep link request to the token service 123. For example, if the confidential data 133 specified in the deep link request specified that personally identifying information such as the user's name, account number, and billing address were to be shared, then the source endpoint 126 could query the source data store 129 to retrieve the user's name, account number, and billing address. Continuing with the example, the source endpoint 126 could then forward the user's name, account number, and billing address to the token service 123.

Next, at block 309, the source endpoint 126 receives a token 146 from the token service 123. The token 146, as previously discussed, can be associated with the confidential data 133 provided to the token service 123 at block 306.

Proceeding to block 313, the source endpoint 126 can then generate a deep link for use by the source application 116. For example, the source endpoint 126 could use the identifier of the destination application 119 that was received at block 303 to search for a schema of the deep link for the destination application 119. The source endpoint 126 could then generate a deep link formatted according to the schema and that includes the token 146 received at block 309. For example, the token 146 could be appended to the end of the deep link in some implementations.

Moving on to block 316, the source endpoint 126 can then return the deep link to the source application 116. As previously mentioned, the deep link can include the token 146 associated with the confidential data 133 specified in the deep link request received at block 303.

Figure 4A:
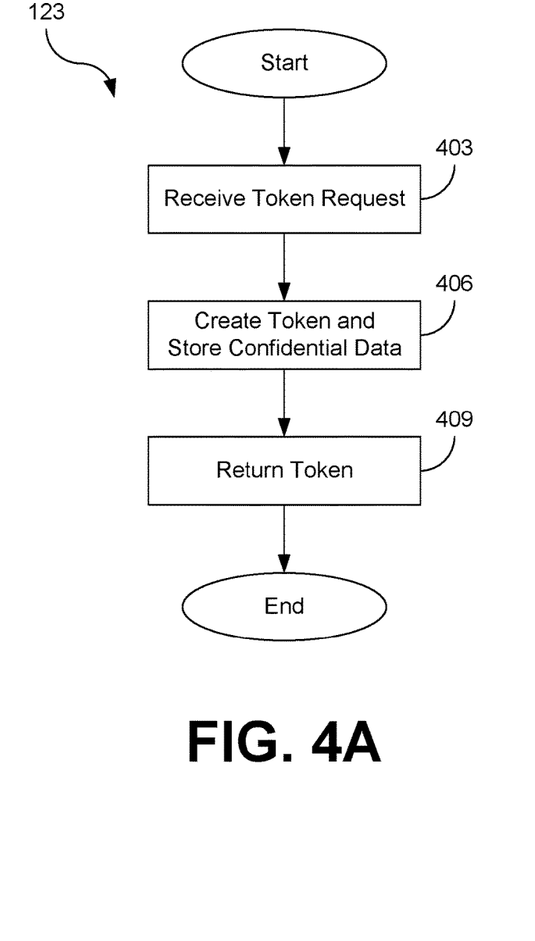
FIG. 4A is a flowchart illustrating one example of functionality implemented as portions of an application executed in a computing environment in the network environment of FIG. 1 according to various embodiments of the present disclosure.

Referring next to FIG. 4A, shown is a flowchart that provides one example of the operation of a portion of the token service 123. The flowchart of FIG. 4A provides merely an example of the many different types of functional arrangements that can be employed to implement the operation of the depicted portion of the token service 123. As an alternative, the flowchart of FIG. 4A can be viewed as depicting an example of elements of a method implemented within the network environment 100.

Beginning with block 403, the token service 123 can receive a token request from the source endpoint 126. The token request can include a set of confidential data 133 (e.g., personally identifying information) that needs to be tokenized.

Then, at block 406, the token service 123 can create a token 146 and store the confidential data 133 received at block 403 in association with the token 146. The token could be created using a variety of approaches. For example, the confidential data 133 provided at block 403 could be concatenated together and provided as an input to a cryptographic hash function to create a unique value. Once the token 146 is created, the token service 123 can create a token record 143 in the source data store 129 to store the token 146 in association with the confidential data 133. This allows for the confidential data 133 to be returned by the token service 123 when the token service 123 is later presented with the token 146.

In some implementations, the token 146 may be intended to operate as a single-use token or only be valid for a specific period of time. In these implementations, the token service 123 could also store information in the token record 143 created at block 406 such as whether the token 146 has been redeemed, when the token 146 and/or token record 143 were created, and/or when the token 146 will expire.

Subsequently, at block 409, the token service 123 can return the token 146 generated at block 406 to the source endpoint 126. Once the token 146 is returned, this process can complete.

Figure 4B:
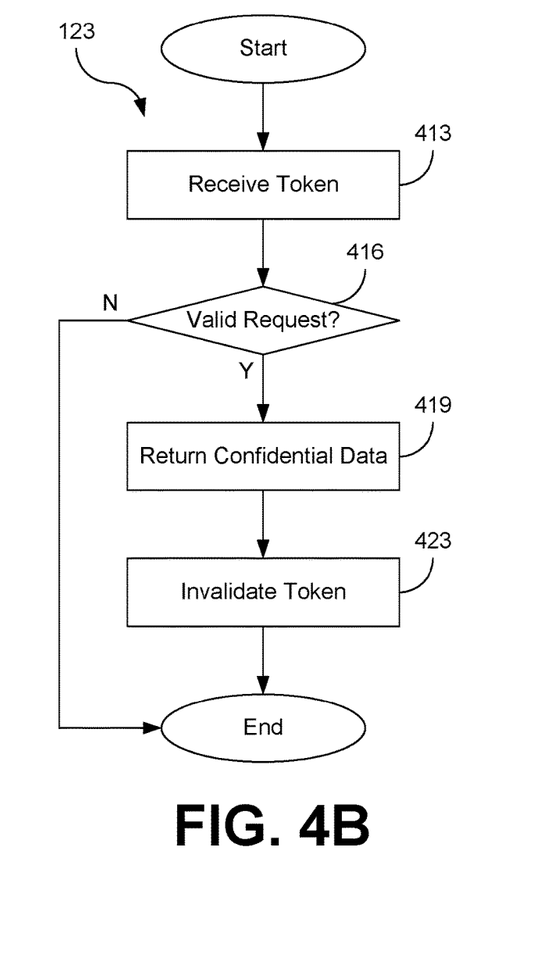
FIG. 4B is a flowchart illustrating one example of functionality implemented as portions of an application executed in a computing environment in the network environment of FIG. 1 according to various embodiments of the present disclosure.

Referring next to FIG. 4B, shown is a flowchart that provides one example of the operation of a portion of the token service 123. The flowchart of FIG. 4B provides merely an example of the many different types of functional arrangements that can be employed to implement the operation of the depicted portion of the token service 123. As an alternative, the flowchart of FIG. 4B can be viewed as depicting an example of elements of a method implemented within the network environment 100.

Beginning with block 413, the token service 123 can receive a token 146 from the destination endpoint 136. This could occur, for example, when the destination endpoint 136 requests confidential data 133 associated with the token 146.

Then, at block 416, the token service 123 can determine whether the token 146 is and/or the request containing the token 146 is valid. If the token 146 and request itself are both valid, then the process can proceed to block 419. If either the token 146 or the request are invalid, then the process can end.

Determining whether the token 146 is valid can be accomplished using a variety of approaches. For example, the token service 123 could search for a token record 143 associated with the token 146. If the token record 143 does not exist, this would indicate that the token 146 is invalid (e.g., because the token record 143 was deleted because the token 146 had been previously used or the token 146 had previously expired). If the token record 143 does exist, then the token service 123 could evaluate the token record 143 to determine whether the token record 143 indicates that the token 146 has been previously redeemed or if the current time is past the expiration period or window for the token 146.

Determining whether the request itself is valid can be performed using a variety of approaches. For example, the token service 123 could evaluate the request to determine the identity of the sender. Once the sender is identified, the token service 123 could determine whether the sender is authorized to request confidential data 133 from the token service 123. This could be done, for example, by determining whether the sender is included in a list of authorized senders (e.g., a list of authorized destination endpoints 136. Alternatively, the token service 123 could authenticate the destination endpoint 136 that had submitted the token 146 (e.g., by using a challenge/response protocol).

If the process proceeds to block 419, the token service 123 can return the confidential data 133 associated with the token 146. For example, the token service 123 could search for a token record 143 using the token 146 as a key or search parameter. Once the token service 123 finds the corresponding token record 143, the token service 123 can retrieve and return the confidential data 133 stored in the token record 143.

Next, at block 423, the token service 123 can invalidate the token 146, which may be done in those implementations where the token 146 is intended to be a single use token. This can be done using several approaches. One approach would be to delete or remove the token record 143. If the token were presented to the token service 123 a second time, the token 146 would be considered invalid because there would no longer be a corresponding token record 143 for the token 146. This approach has the additional security benefit of minimizing the amount of data retained. Alternatively, the token service 123 could update the token record 143 to indicate that the token 146 has been redeemed. Should the token 146 be presented to the token service 123 a second time, then the token service 123 could realize that the token 146 has already been redeemed for confidential data 133 when it review the token record 143. Once the token 146 is invalidated, the process can end.

Figure 5:
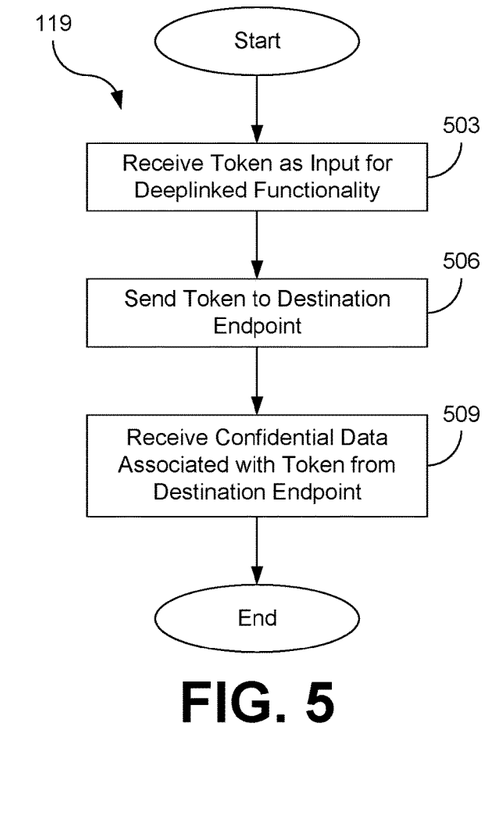
FIG. 5 is a flowchart illustrating one example of functionality implemented as portions of an application executed in a computing environment in the network environment of FIG. 1 according to various embodiments of the present disclosure.

Referring next to FIG. 5, shown is a flowchart that provides one example of the operation of a portion of the destination application 119. The flowchart of FIG. 5 provides merely an example of the many different types of functional arrangements that can be employed to implement the operation of the depicted portion of the destination application 119. As an alternative, the flowchart of FIG. 5 can be viewed as depicting an example of elements of a method implemented within the network environment 100.

Beginning with block 503, the destination application 119 can receive a token 146 from the source application 116 as an argument or input for the functionality provided by the destination application 119 that was referenced in the deep link invoked or processed by the source application 116 (e.g., as previously described at block 223 in FIG. 2). For example, the destination application 119 could use the token 146 an argument to be processed when the destination application 119 begins execution. In some implementations, the token 146 can be included in the deep link, in which case the destination application 119 can parse the deep link to obtain the token 146. In other implementations, the token 146 can be provided to the destination application 119 separately.

Then, at block 506, the destination application 119 can send the token 146 to the destination endpoint 136 associated with the destination application 119.

Next, at block 509, the destination application 119 can receive the confidential data 133 associated with the token 146 from the destination endpoint 136. Once received, the destination application 119 can then use the confidential data 133 as needed or desired.

Figure 6:
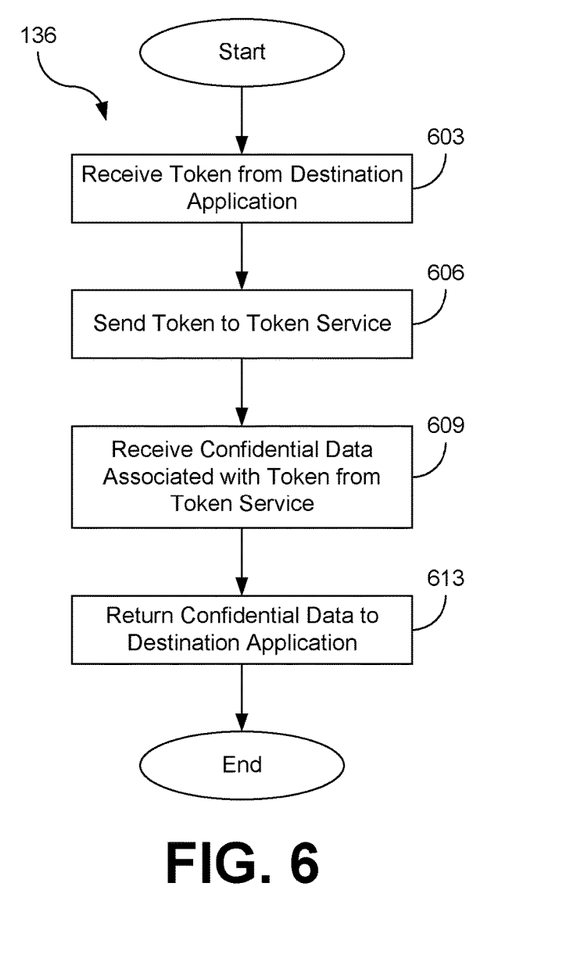
FIG. 6 is a flowchart illustrating one example of functionality implemented as portions of an application executed in a computing environment in the network environment of FIG. 1 according to various embodiments of the present disclosure.

Referring next to FIG. 6, shown is a flowchart that provides one example of the operation of a portion of the destination endpoint 136. The flowchart of FIG. 6 provides merely an example of the many different types of functional arrangements that can be employed to implement the operation of the depicted portion of the destination endpoint 136. As an alternative, the flowchart of FIG. 6 can be viewed as depicting an example of elements of a method implemented within the network environment 100.

Beginning with block 603, the destination endpoint 136 can receive a token 146 from the destination application 119. This could be received as part of a request from the destination application 119 to obtain the confidential data 133 that the source application 116 has authorized or intends to share with the destination application 119.

Then, at block 606, the destination endpoint 136 can send the token 146 to the token service 123. In some implementations, the destination endpoint 136 could also send additional information verifying its identity as an authorized destination endpoint 136. In one example, the destination endpoint 136 could cryptographically sign the token 146 with a cryptographic key that is approved, authorized, or trusted by the token service 123.

Moving on to block 609, the destination endpoint 136 can receive from the token service 123 the confidential data 133 associated with the token 146. Once received, then the destination endpoint 136 can relay the confidential data 133 back to the destination application 119. In some implementations, the destination endpoint 136 could cache the confidential data 133 in the destination data store 139 for future use by the destination application 119 or the destination endpoint 136. This caching could occur at either block 609 or at block 613.

Figure 7:
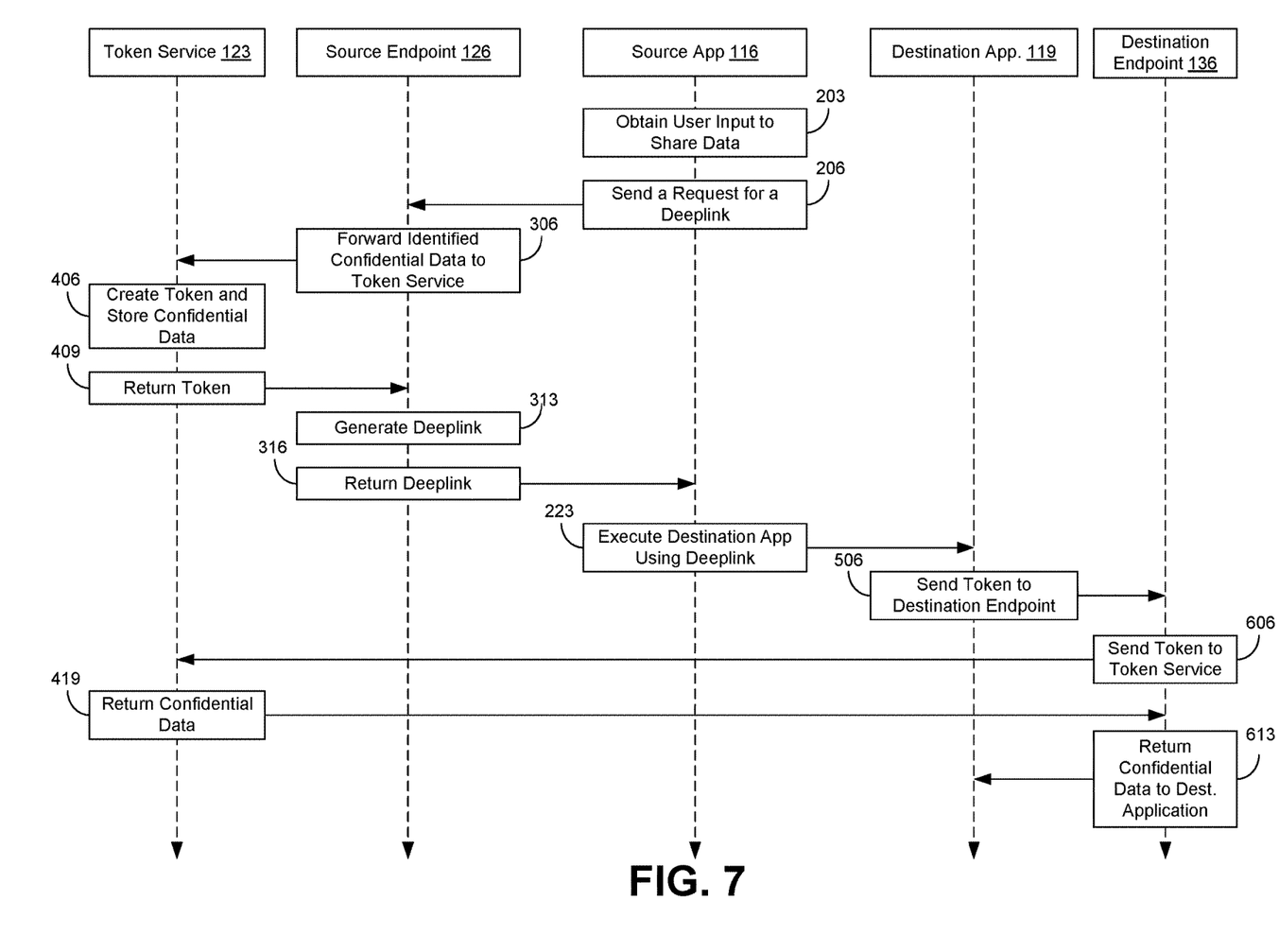
FIG. 7 is a sequence diagram illustrating one example the interactions between the components of the network environment of FIG. 1 according to various embodiments of the present disclosure.

Referring next to FIG. 7, shown is a sequence diagram that illustrates the interactions between the source application 116, the destination application 119, the token service 123, the source endpoint 126, and the destination endpoint 136 in order to securely share confidential data 133 between the source application 116 and the destination application 119. The sequence diagram of FIG. 7 provides merely an example of the many different types of functional arrangements that can be employed to share confidential data 133 between the source application 116 and the destination application 119. As an alternative, the sequence diagram of FIG. 7 can be viewed as depicting an example of elements of a method implemented within the network environment 100.

To begin, the source application 116 can obtain user input to share confidential data 133 with the destination application 119, as previously described in the discussion of block 203 of FIG. 2. The source application 117 can then send a request for a deep link to the source endpoint 126, as previously described in the discussion of block 206 of FIG. 2. The source endpoint 126 can then forward to the token service 123 the identity of the set or subset of confidential data 133 to be shared, as previously described in the discussion of block 306 of FIG. 3. The token service 123 can then create a token 146 and store the token 146 and store the token in association with the confidential data 133 in a token record 143, as previously described in the discussion of block 406 of FIG. 4A. The token service 123 can then return the token 146 to the source endpoint 126, as previously described in the discussion of block 409 of FIG. 4A. The source endpoint 126 can, in turn, create the deep link for the destination application 119 that was requested by the source application 116, as previously described in the discussion of block 313 of FIG. 3. Once the deep link is created, the deep link and the token 146 can be returned by the source endpoint 126 to the source application 116, as previously described in the discussion of block 316 of FIG. 3. Once the source application 116 receives the deep link and token 146, it can execute the destination application 119 using the deep link as previously described in the discussion of block 223 of FIG. 2. The destination application 119 can then send the token 146 to the destination endpoint 136, as previously described in the discussion of block 506 of FIG. 5. The destination endpoint 136 can, in turn, send the token 146 to the token service 123, as previously described in the discussion of block 606 of FIG. 6. In response to receiving the token 146, the token service 123 can return the confidential data 133 associated with the token 146 to the destination endpoint 136, as previously described in the discussion of block 419 of FIG. 4B. The destination endpoint 136 can then return the confidential data 133 to the destination application 119, as previously described in the discussion of block 613 of FIG. 6. As a result, the confidential data 133 is shared with the destination application 119 by the source application 116 without risk of interception by other applications executing on the client device 103.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a client device comprising a processor and a memory;
a first application comprising a first set of machine-readable instructions stored in the memory that, when executed by the processor, cause the client device to at least:
 obtain a user input to share a set of data with a second application, the user input identifying that the set of data that is approved to be shared with the second application;
 in response to the user input, send a request for a deep link to a second computing device, the deep link being associated with the second application installed on the client device;
 receive the deep link from the second computing device, the deep link comprising a token representing the set of data; and
 process the deep link to execute the second application, wherein the second application is configured to accept the token as an argument for execution; and
the second application comprises a second set of machine-readable instructions stored in the memory that, when executed by the processor, cause the client device to at least:
 send the token to a third computing device; and
 receive the set of data from the third computing device in response to the token being sent to the third computing device.

2. The system of claim 1, wherein the first application further causes the client device to at least authenticate the second application prior to processing the deep link to execute the second application.

3. The system of claim 2, wherein the first application, when authenticating the second application, further causes the client device to at least compare a name space of the second application to a schema of the deep link.

4. The system of claim 1, wherein the first application, when processing the deep link to execute the second application, further causes the client device to at least:
determine that the second application is not currently installed on the client device; and
cause the second application to be installed on the client device.

5. The system of claim 1, wherein the token is a single use token.

6. The system of claim 1, wherein the token is valid for a predefined period of time.

7. The system of claim 1, wherein the request for the deep link further identifies the set of data.

8. A method, comprising:
receiving a deep link request from a client device, the deep link request identifying a set of data to be shared and a deep link schema;
creating a token that represents the set of data;
creating a deep link that complies with the deep link schema and comprises the token;
returning the deep link and the token to the client device;
receiving a data request from a second computing device, the data request comprising the token; and
returning the set of data to the second computing device.

9. The method of claim 8, further comprising:
- authenticating the second computing device; and
- returning the set of data to the second computing device occurs in response to authenticating the second computing device.

10. The method of claim 9, wherein authenticating the second computing device comprises determining that the second computing device has been previously authorized to receive the set of data.

11. The method of claim 8, further comprising invalidating the token in response to returning the set of data to the second computing device.

12. The method of claim 11, wherein invalidating the token further comprises deleting a token record representing an association between the token and the set of data.

13. The method of claim 11, wherein the set of data comprises personally identifying information (PII) of a user of the client device.

14. A method, comprising:
- obtaining, with a first application installed on a client device, a user input to share personally identifying information with a second application, the user input identifying a set of data that is approved to be shared with the second application;
- sending, with the first application, a request for a deep link to a second computing device, the deep link being associated with the second application installed on the client device;
- receiving, with the first application, the deep link from the second computing device, the deep link comprising a token representing the set of data; and
- processing, with the first application, the deep link to execute the second application, wherein the second application is configured to accept the token as an argument for execution; and
- sending, with the second application, the token to a third computing device; and
- receiving, with the second application, the set of data from the third computing device.

15. The method of claim 14, further comprising authenticating the second application prior to processing the deep link to execute the second application.

16. The method of claim 15, wherein authenticating the second application further comprises comparing, with the first application, a name space of the second application to a schema of the deep link.

17. The method of claim 14, wherein processing the deep link to execute the second application further comprises:
- determining, with the first application, that the second application is not currently installed on the client device; and
- causing the second application to be installed on the client device.

18. The method of claim 14, wherein the token is a single use token.

19. The method of claim 14, wherein the token is valid for a predefined period of time.

20. The method of claim 14, wherein the request for the deep link further identifies the set of data.

* * * * *

UNITED STATES PATENT AND TRADEMARK OFFICE
CERTIFICATE OF CORRECTION

| | | |
|---|---|---|
| PATENT NO. | : 12,155,765 B1 | Page 1 of 1 |
| APPLICATION NO. | : 17/556340 | |
| DATED | : November 26, 2024 | |
| INVENTOR(S) | : Jile Gao et al. | |

It is certified that error appears in the above-identified patent and that said Letters Patent is hereby corrected as shown below:

On the Title Page

In item (72), the correct Country of the tenth inventor, Brent Watson, is CA.

Signed and Sealed this
Fourteenth Day of October, 2025

John A. Squires
*Director of the United States Patent and Trademark Office*